United States Patent
Agarwal et al.

(10) Patent No.: US 12,316,707 B1
(45) Date of Patent: May 27, 2025

(54) SYSTEMS AND METHODS FOR A MOBILE APPLICATION ARCHITECTURE USING BACKEND-FOR-FRONTEND IN A TIERED SOFTWARE FRAMEWORK

(71) Applicant: HighLevel Inc., Dallas, TX (US)

(72) Inventors: Raveesh Agarwal, Ranchi (IN); Shaun Clark, Eugene, OR (US); Robin Alex, Dallas, TX (US); Varun Vairavan, Doha (QA)

(73) Assignee: HighLevel Inc., Dallas, TX (US)

( * ) Notice: Subject to any disclaimer, the term of this patent is extended or adjusted under 35 U.S.C. 154(b) by 5 days.

(21) Appl. No.: 18/508,729

(22) Filed: Nov. 14, 2023

(51) Int. Cl.
  H04L 29/06 (2006.01)
  H04L 67/1036 (2022.01)
  H04L 67/133 (2022.01)
  H04W 4/12 (2009.01)
  H04W 12/06 (2021.01)

(52) U.S. Cl.
  CPC ........ *H04L 67/133* (2022.05); *H04L 67/1036* (2013.01); *H04W 4/12* (2013.01); *H04W 12/06* (2013.01)

(58) Field of Classification Search
  CPC .... H04L 67/133; H04L 67/1036; H04W 4/12; H04W 12/06
  See application file for complete search history.

(56) References Cited

U.S. PATENT DOCUMENTS

| | | | | |
|---|---|---|---|---|
| 10,817,343 B2 * | 10/2020 | Ngai | ....... | G06F 9/5072 |
| 11,689,498 B1 * | 6/2023 | Kumar | ....... | H04L 61/5007 |
| | | | | 709/245 |
| 2007/0198933 A1 * | 8/2007 | van der Bogert | ..... | G06F 21/604 |
| | | | | 715/741 |
| 2014/0373098 A1 * | 12/2014 | Fausak | ........ | H04L 63/102 |
| | | | | 726/4 |
| 2015/0095973 A1 * | 4/2015 | Neumueller | ............ | H04L 63/20 |
| | | | | 726/1 |
| 2015/0229638 A1 * | 8/2015 | Loo | ........ | H04W 12/06 |
| | | | | 726/11 |
| 2016/0104146 A1 * | 4/2016 | Peyton | ........ | G06Q 20/12 |
| | | | | 705/44 |
| 2017/0004197 A1 * | 1/2017 | Dennis | ........ | G06F 16/2365 |
| 2018/0310149 A1 * | 10/2018 | Lee | ........ | H04W 4/50 |

(Continued)

*Primary Examiner* — Atta Khan
*Assistant Examiner* — Wuji Chen
(74) *Attorney, Agent, or Firm* — Aambell PC

(57) ABSTRACT

Embodiments of a method for operating a mobile application using backend-for-frontend in a tiered software framework comprises: communicating, by a mobile aggregator, first messages over a wireless communication network with a frontend of the mobile application executing in a mobile device, the messages comprising instructions in Remote Procedure Call protocol; identifying services of the mobile application called by the instructions, the services executing in a cloud network; generating second messages in another protocol compatible with communication in the cloud network; and communicating the second messages to the services. The mobile application includes a presentation layer, an application layer, and a data layer. The presentation layer executes in the mobile device, the application layer executes in a first server in the cloud network, the data layer executes in a second server in the cloud network, and the mobile aggregator does not store any history of the messages.

20 Claims, 8 Drawing Sheets

(56) References Cited

U.S. PATENT DOCUMENTS

| | | | |
|---|---|---|---|
| 2019/0243985 A1* | 8/2019 | Goodridge | G06F 21/6218 |
| 2019/0303118 A1* | 10/2019 | Avinash Dorle | H04L 41/5009 |
| 2019/0317847 A1* | 10/2019 | Fujino | G06F 9/547 |
| 2020/0274719 A1* | 8/2020 | Pak | G06F 9/4416 |
| 2021/0399994 A1* | 12/2021 | Leach | H04L 67/10 |

* cited by examiner

SYSTEMS AND METHODS FOR A MOBILE APPLICATION ARCHITECTURE USING BACKEND-FOR-FRONTEND IN A TIERED SOFTWARE FRAMEWORK

TECHNICAL FIELD

The present disclosure relates to systems, techniques, and methods directed to a mobile application architecture using backend-for-frontend (BFF) in a tiered software framework.

BACKGROUND

Mobile applications are software programs specifically designed to run on mobile devices such as smartphones and tablets. These mobile applications are tailored to take advantage of the unique features and capabilities of mobile devices, such as touchscreens, global positioning systems, cameras, and accelerometers. Various types of mobile applications are available, from productivity enhancement tools (e.g., applications that help users manage tasks, schedules, emails, etc.), to entertainment (e.g., applications that provide games, multi-media streaming platforms, social media, etc.), to utility (e.g., applications that offer specific functionalities, such as weather forecasts, maps, banking, etc.) and communication (e.g., applications that enable voice calling, text messaging, etc.). Mobile applications are typically available for download from digital distribution platforms such as the Apple App Store™ and Google Play Store.™ Mobile applications are typically developed using specific programming languages and frameworks tailored to the operating systems of the respective mobile devices.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

DETAILED DESCRIPTION

Overview

Figure 1:
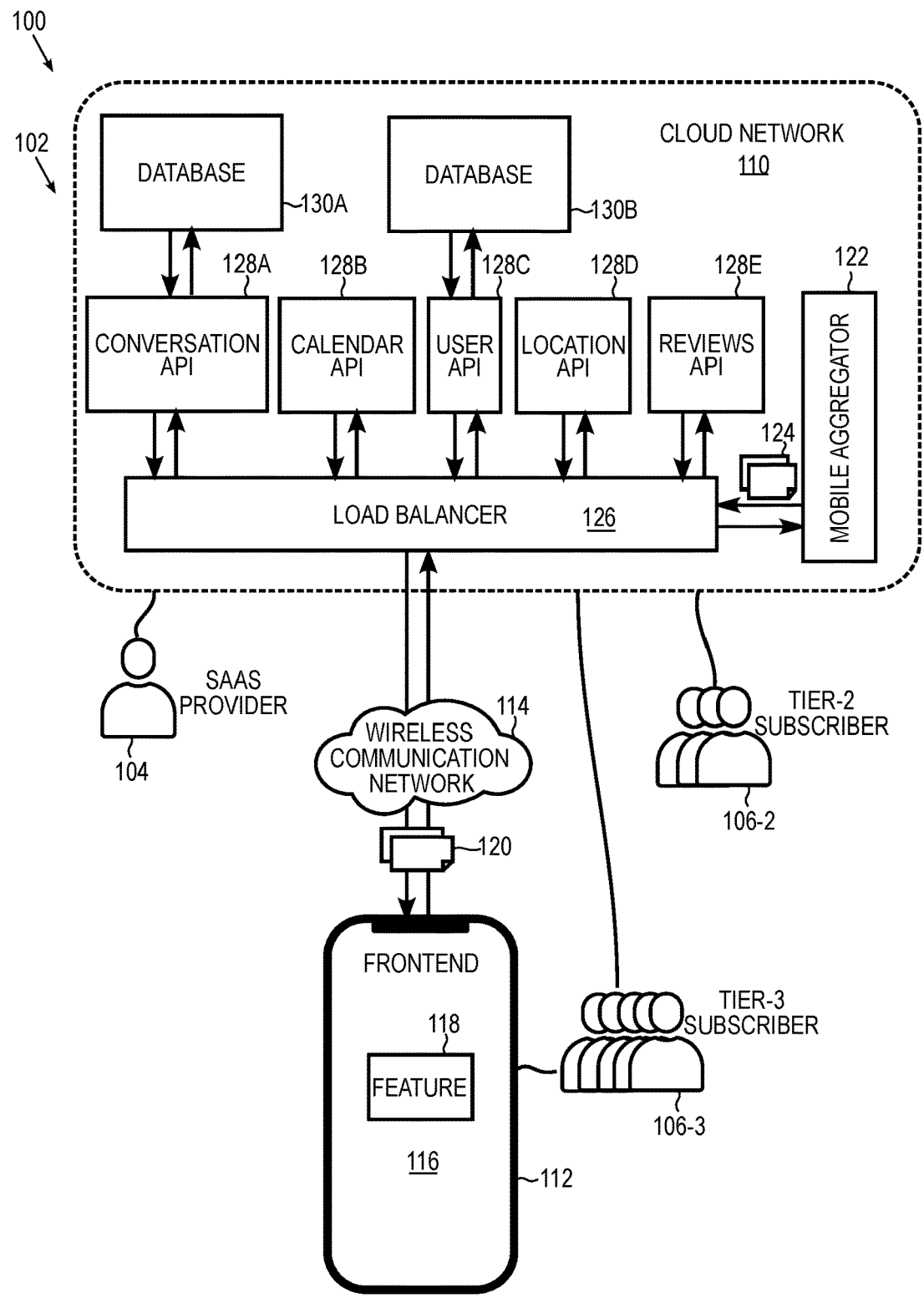
FIG. 1 is a simplified block diagram illustrating an example system for a mobile application architecture using BFF in a tiered software framework, according to some embodiments of the present disclosure.

For purposes of illustrating the embodiments described herein, it is important to understand certain terminology and operations of technology networks. The following foundational information may be viewed as a basis from which the present disclosure may be properly explained. Such information is offered for purposes of explanation only and, accordingly, should not be construed in any way to limit the broad scope of the present disclosure and its potential applications.

Typical mobile application architecture comprises a frontend portion (executing in the mobile device) and a backend portion hosted in a server on a cloud network. The frontend typically communicates directly with the backend. Such mobile applications involve the following components: (1) mobile application layer that includes user interface (UI) components and application logic that governs user experience (UX); (2) backend services layer that consists of application features (e.g., functionalities and components) with which users interact directly on their mobile devices; (3) networking layer that facilitates communication between the frontend and the backend; and (4) data layer that encompasses various data models, repositories, and local storage mechanisms to manage data within the mobile application.

Such an architecture results in lag time of the order of a few seconds when the frontend communicates with the backend over the wireless communication network as each click in the frontend may need to be converted into a request that is transmitted over the wireless communication network to the appropriate backend service and each response from the backend service is also transmitted over the wireless communication network to the frontend. Each such communication transaction may be of the order of around 500 milliseconds so that a mobile application requiring around 10 such requests and responses has a lag time of around 5 seconds for each click, which may lead to a poor user experience.

A BFF can optimize the communication between the frontend and the backend by tailoring the backend to the requirements of the frontend, hence improving overall performance and user experience. The BFF can allow backend services to be customized according to the specific requirements of the frontend, enabling a more efficient and streamlined communication process, reducing unnecessary data transfer, and minimizing the number of round trips between the frontend and the backend. The BFF can also enable the development team to make changes and updates to the backend without impacting other parts of the mobile application, thereby providing more flexibility and agility in the development process. BFF further allows for the implementation of specific security measures customized to the frontend, so that only certain required data is exposed to the frontend.

However, the mere presence of the BFF may not be sufficient for optimized performance of the mobile application. For example, there is a risk that the BFF can write data into the backend, corrupting data across the platform for other formats of the application (e.g., desktop applications). Managing and synchronizing changes between the frontend, the BFF, and the backend can be challenging, especially when making updates or modifications to the mobile application's features. If the BFF is not properly designed for resilience and high availability, it can become a single point of failure for the entire application, affecting the overall UX.

Accordingly, embodiments of a mobile application architecture as described herein include a mobile aggregator that is stateless and does not write to any database (or overwrite any backend services). The frontend executing in the mobile device is agnostic to the database or services and communicates only with the mobile aggregator that functions partially as a BFF, routing all requests to the appropriate backend services. In addition, the application layer comprising the business logic of the mobile application is included in the mobile aggregator, so that only the presentation layer is executing in the mobile device. In an example embodiment, the mobile application may be created using Flutter,™ and the mobile aggregator may be built using Dart,™ which is an open-source programming language.

A user logging into the frontend can trigger a series of requests and responses to multiple backend services, such as authentication, account state retrieval, account history, account settings, etc. Each of the request and response may take 500 milliseconds over the wireless communication network in a mobile application architecture without the mobile aggregator, resulting in a delay of, say, 5 seconds between the time a user requests to login, and the time the user is actually logged into the user's account. With the mobile aggregator, the same series of requests and responses can be divided into two sets: (1) a pair of messages (e.g., request and response) between the frontend and the mobile aggregator for authentication; which in turn triggers (2) a series of messages between the mobile aggregator and the various APIs in the backend using server to server or intra-app messages. The first set may take 500 milliseconds for each message; however, the second set may take only 20 milliseconds each, resulting in a delay of only 1.16 seconds between the time the user requests to login and the time the user is actually logged into the user's account.

In the following detailed description, various aspects of the illustrative implementations may be described using terms commonly employed by those skilled in the art to convey the substance of their work to others skilled in the art.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The term "computing device" means a server, a desktop computer, a laptop computer, a smartphone, or any device with a microprocessor, such as a central processing unit (CPU), general processing unit (GPU), or other such electronic component capable of executing processes of a software algorithm (such as a software program, code, application, macro, etc.).

The term "cloud network" means a network of computing devices coupled together in a public, private, or hybrid communications network. Communication in the cloud network may use one or more wired, wireless, broadband, radio, and other kinds of communicative means. The Internet is an example of a cloud network.

As used herein, the term "application" can be inclusive of an executable file comprising instructions that can be understood and processed on a computing device such as a computer, and may further include library modules loaded during execution, object files, system files, hardware logic, software logic, or any other executable modules. Applications are generally configured to perform particular tasks, or functions according to the type of application.

The description uses the phrases "in an embodiment" or "in embodiments," which may each refer to one or more of the same or different embodiments.

Although certain elements may be referred to in the singular herein, such elements may include multiple sub-elements. For example, "a computing device" may include one or more computing devices.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as routers, switches, antennas, communication devices, etc. in the networks disclosed that are not shown in the figures to prevent cluttering. Systems and networks described herein may include, in addition to the elements described, other components and services, including network management and access software, connectivity services, routing services, firewall services, load balancing services, content delivery networks, virtual private networks, etc. Further, the figures are intended to show relative arrangements of the components within their systems, and, in general, such systems may include other components that are not illustrated (e.g., various electronic components related to communications functionality, electrical connectivity, etc.).

In the drawings, a particular number and arrangement of structures and components are presented for illustrative purposes and any desired number or arrangement of such structures and components may be present in various embodiments. Further, unless otherwise specified, the structures shown in the figures may take any suitable form or shape according to various design considerations, manufacturing processes, and other criteria beyond the scope of the present disclosure.

Figure 11:
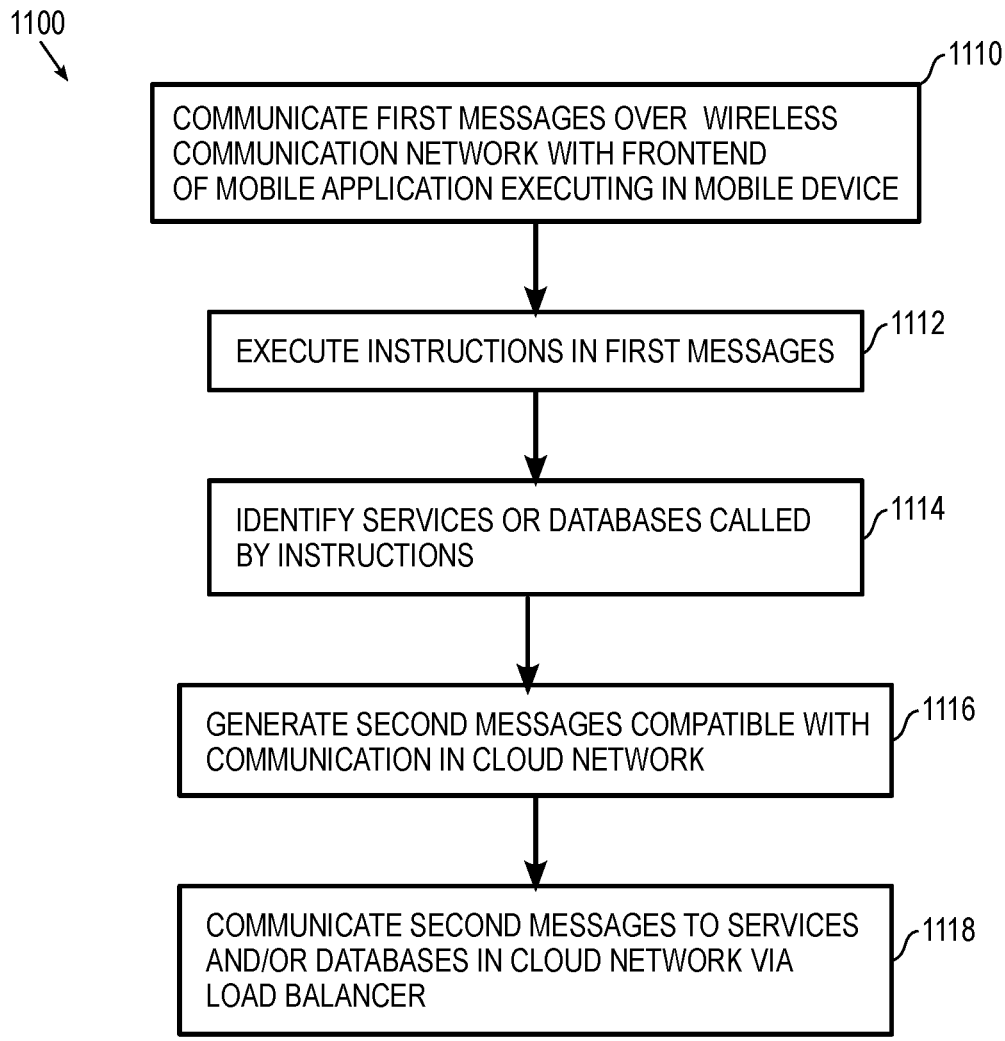
FIG. 11 is a simplified flow diagram illustrating yet other example operations associated with the mobile application, according to some embodiments of the present disclosure.

For convenience, if a collection of drawings designated with different letters are present (e.g., FIGS. 11A-11G), such a collection may be referred to herein without the letters (e.g., as "FIG. 11"). Similarly, if a collection of reference numerals designated with different letters are present (e.g., 106a, 106b), such a collection may be referred to herein without the letters (e.g., as "106") and individual ones in the collection may be referred to herein with the letters. Further, labels in upper case in the figures (e.g., 106A) may be written using lower case in the description herein (e.g., 106a) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

EXAMPLE EMBODIMENTS

FIG. 1 is a simplified block diagram illustrating an example mobile application 100 according to some embodiments of the present disclosure. In the example embodiment shown, mobile application 100 has three tiers: 102-1, 102-2, and 102-3. Note that the labeling convention followed herein uses the hyphen followed by a number to denote a separate tier corresponding to the number (e.g., "–1" denotes tier-1, "–2" denotes tier-2, and "–3" denotes tier-3). Mobile application 100 may be managed by a software-as-a-service (SaaS) provider 104, who may provide one or more downstream subscriber 106-2 at tier 102-2 with access to mobile application 100. In turn, subscriber 106-2 may provide one or more downstream subscriber 106-3 at tier 102-3 with access to certain features of mobile application 100. SaaS provider 104 and subscribers 106 (e.g., 106-2 and 106-2) may include an entity (i.e., a company, an organization, etc.) in various embodiments. Human users at SaaS provider 104, and subscribers 106 may operate or otherwise use mobile application 100 through one or more devices.

In various embodiments, a single one of SaaS provider 104 may have multiple subscribers 106-2 at tier 102-2; a single one of subscribers 106-2 at tier 102-2 may have multiple subscribers 106-3 at tier 102-3. Subscribers 106-2 may have accounts with SaaS provider 104 at tier 102-1; subscribers 106-3 may have accounts with subscribers 106-2 at tier 102-2. In various embodiments, SaaS provider 104 may bill subscribers 106-2; subscribers 106-2 in turn may bill subscribers 106-3. The billing at each tier 102 may be based on a variety of factors that may or may not be independent of each other, including application resources used by subscribers 106, number of individual users authorized by subscribers 106 to access mobile application 100, and other such factors beyond the scope of the present disclosure.

A portion of mobile application 100 may execute in a cloud network 110. A mobile device 112, such as a smartphone, mobile computing device, mobile phone, iPad™, Google Droid™, etc. may communicate with cloud network 110 over a wireless communication network 114. In various embodiments, wireless communication network 114 may include cellular networks (e.g., associated with specific frequency bands 3G, 4G, 5G, etc.), and satellite networks. Wireless communication network 114 as used herein typically does not encompass near field communication networks, radio-frequency identification (RFID) networks, or Wi-Fi networks, although in some embodiments, such wireless networks may be used without departing from the broad scope of the disclosure. Mobile application 100 may include a frontend 116 executing in mobile device 112.

Selecting a feature 118 in frontend 116 may trigger one or more messages 120 between frontend 116 and a mobile aggregator 122 executing in cloud network 110. Mobile aggregator may analyze messages 120 and generate one or more messages 124 to one or more components of mobile application 100 executing in cloud network 110. In various embodiments, mobile aggregator 122 may operate as a BFF, interfacing between frontend 116 and backend services executing in cloud network 110. In an example embodiment, messages 124 may be sent to a load balancer 126, which may route further to one or more services 128 (e.g., conversation API 128a, calendar API 128b, user API 128c, location API 128d, and reviews API 128e) and/or databases 130 (e.g., Mongodb™ database 130a, Firebase™ database 130b).

In some embodiments, mobile aggregator 122, like other services 128, may be scaled individually, across pods, and may "sit" behind load balancer 126. In other words, mobile frontend feature 118 gains access to mobile aggregator 122 via the load balancing process executing in load balancer 126. Load balancer 126 may comprise the "intelligent" element which, if it sees that a request is within cloud network 110 and/or mobile application 100, may route the request through faster channels (e.g., intra-app messages 124), avoiding the public infrastructure, thus providing latency gains.

Note that as used here, the term "service" refers to a self-contained unit of functionality provided in or by mobile application 100. Services 128 are configured to perform certain tasks (e.g., operations) often with the goal of providing respective functionalities. In some embodiments, services 128 may comprise microservices communicating with each other through well-defined APIs. In general, services 128 offer functionalities related to the Saas platform provided by the tiered software framework as described further herein. Databases 130 may be of any suitable type and number as hosted in cloud network 110. Databases 130 may store structured data or unstructured data or both. Some databases 130 may offer real-time data synchronization, and some other databases 130 may offer different types of querying functionalities. Note that any suitable type of database may be encompassed by databases 130 within the broad scope of the embodiments described herein.

Messages 120 may be formatted according to Google™ Remote Procedure Call (gRPC), whereas messages 124 may be formatted according to server to server (STS) protocols, such as Simple Object Access Protocol (SOAP), Hypertext Transfer Protocol (HTTP), Extensible Markup Language (XML), Representational State Transfer (REST), Message Queuing Telemetry Transport (MQTT), Advanced Message Queuing Protocol (AMQP) and Extensible Messaging and Presence Protocol (XMPP). gRPC is a Remote Procedure Call (RPC) format enabling efficient and interoperable communication. Using gRPC, frontend 116 can directly call a method on mobile aggregator 122, which is executing on a different machine in cloud network 110 as if it were a local object, making it easier to create distributed applications and services. While each gRPC communication may incur the same round trip time (RTT) as in any other architecture without mobile aggregator 122, the latter can eliminate the need for additional messaging over wireless communication network 114 by translating a single gRPC request into multiple STS messages 124 within the backend. Multiple STS messages 124 can be of the order of tens of milliseconds, rather than hundreds of milliseconds, thereby reducing the lag in communication and enhancing the overall UX.

In general, RPC, of which gRPC is a particular example, is a software communication protocol that frontend 116 uses to request one or more services 128 located in another network (e.g., cloud network 110) without understanding or accounting for communication protocol details of the underlying networks, such as wireless communication network 114 or cloud network 110. In other words, RPC is used to call processes on a remote system as though the remote system were a local system. RPC uses a client-server model. The requesting program, namely frontend 116 (when frontend 116 generates a request) is a client, and the service providing the program, namely mobile aggregator 122 (when mobile aggregator 122 is providing the response) is the server.

During operation in an example embodiment, selection of feature 118 (by a user associated with access credentials of one of subscribers 106-3) may invoke one or more services 128 and/or databases 130 in cloud network 110 or other processes in mobile aggregator 122, triggering generation of message 120. When message 120 in RPC is invoked, the calling environment in mobile device 112 is suspended, the procedure parameters are transferred across wireless communication network 114 to the environment where the procedure is to execute, namely in mobile aggregator 122, and the procedure is then executed in that environment. When the procedure finishes, the results are transferred back to the calling environment, where execution resumes as if returning from a regular procedure call. During the RPC, the following steps may be executed: (1) a client associated with feature 118 in frontend 116 calls a client stub in frontend 116. The call is a local procedure call with parameters pushed onto the stack according to in-app procedures. The client stub packs the procedure parameters into message 120 and makes a system call to send message 120. The local operating system of mobile device 112 sends message 120 from mobile device 112 to the remote server in which mobile aggregator 122 is executing.

In many embodiments, message 120 from mobile device 112 first reaches load balancer 126, which examines message 120, identifies mobile aggregator 122 as the recipient of message 120 (e.g., based on the public network address exposed by mobile aggregator 122) and routes message 120 to mobile aggregator 122. Load balancer 126 may execute in the same server as mobile aggregator 122 in some embodiments; in other embodiments, load balancer 126 may execute in another server remote from mobile aggregator 122 within cloud network 110.

When the remote server in which mobile aggregator 122 is provisioned receives message 120, the remote server's operating system passes the incoming packets to a server stub executing in mobile aggregator 122. The server stub unpacks the parameters from message 120. In various embodiments, message 120 may comprise instructions to execute feature 118. Mobile aggregator 122 may execute the instructions accordingly. During the execution, one or more services 128 and/or databases 130 may be accessed via messages 124 through load balancer 126. Such access may be through other protocols (i.e., non-RPC protocols) compatible with communication in cloud network 110. Examples of such other protocols include REST, JSON, etc.

When the server procedure is finished, it returns to the server stub, which marshals the return values into another message 120. The server stub then hands response message 120 to the transport layer, which sends the resulting message back to the client transport layer over wireless communication network 114, and response message 120 is eventually handed to the client stub. The client stub unpacks the return parameters, and execution returns to frontend 116. In various embodiments, each feature 118 of mobile application 100 may be associated with separate sets of messages 120 (e.g., login may be associated with a first set of messages 120; clicking on scheduling may be associated with a second set of messages 120; selecting a plumber may be associated with a third set of messages 120; and so on).

For example, a user logging into frontend 116 can trigger the following series of requests and responses to multiple backend services: (1) a call into an authentication system or database (e.g., database 130b) for authenticating the user's credentials; (2) a response from the authentication system or database authenticating the user's credentials; (3) a request to user API 128c for retrieving the last known state of the user account; (4) a response from user API 128c providing the last known state of the user account; (5) a request to location API 128d for customer information; (6) a response from location API 128d with the customer information; (7) another request to location API 128d for a map having the customer information; (8) another response from location API 128d with the map having the customer information; (9) a request to another database 130a for the most recent activities in the account; and (10) a response from database 130a with the most recent activities in the account. Each of the request and response may take 500 milliseconds over wireless communication network 114 in a mobile application architecture without mobile aggregator 122, resulting in a delay of 5 seconds between the time a user requests to login, and the time the user is actually logged into the user's account.

With mobile aggregator 122 as in embodiments described herein, the same series of requests and responses can be divided into two sets: (1) a pair of messages 120 between frontend 116 and mobile aggregator 122 for logging in; and (2) a series of messages 124 between mobile aggregator 122 and the various API's using STS or intra-app messages 124. The first set may take 500 milliseconds for each message 120; however, the second set may take only 20 milliseconds each, resulting in a delay of only 1.16 seconds between the time the user requests to login and the time the user is actually logged into the user's account.

In various embodiments, each request in message 120 from frontend 116 to the backend services in cloud network 110 may contain substantially all information necessary to understand and fulfill the request. Thus, mobile aggregator 122 may not store any transaction history between messages 120. In other words, mobile aggregator 122 is stateless in such embodiments. Transaction history may include client context such as user preferences and settings, session data, user authentication and authorization information, device information, user behavior and interaction data, etc. Such transaction history may be stored in frontend 116 in some embodiments, or in one or more services 128 in cloud network 110.

In some embodiments, mobile aggregator 122 may not have credentials to modify any of the services 128 and/or write into any database 130. In some such embodiments, mobile aggregator 122 may subscribe to services 128 and/or database 130 through an update service API so that any updates are propagated to mobile aggregator 122 without any further action from mobile aggregator 122. In various embodiments, mobile aggregator 122 may act as a broker between frontend 116 and other components of mobile application 100. For example, mobile aggregator 122 may function as a message broker facilitating communication between frontend 116 and load balancer 126 by enabling the exchange of messages 120 and 124 in respectively different formats. Mobile aggregator 122 may also function as a service broker managing interactions between different services 128 and frontend 116, for example, by coordinating service requests, service provisioning, and service consumption via load balancer 126. In some such embodiments, frontend 116 may be agnostic to services 128 and/or database 130 as it interacts only with mobile aggregator 122.

Figure 2:
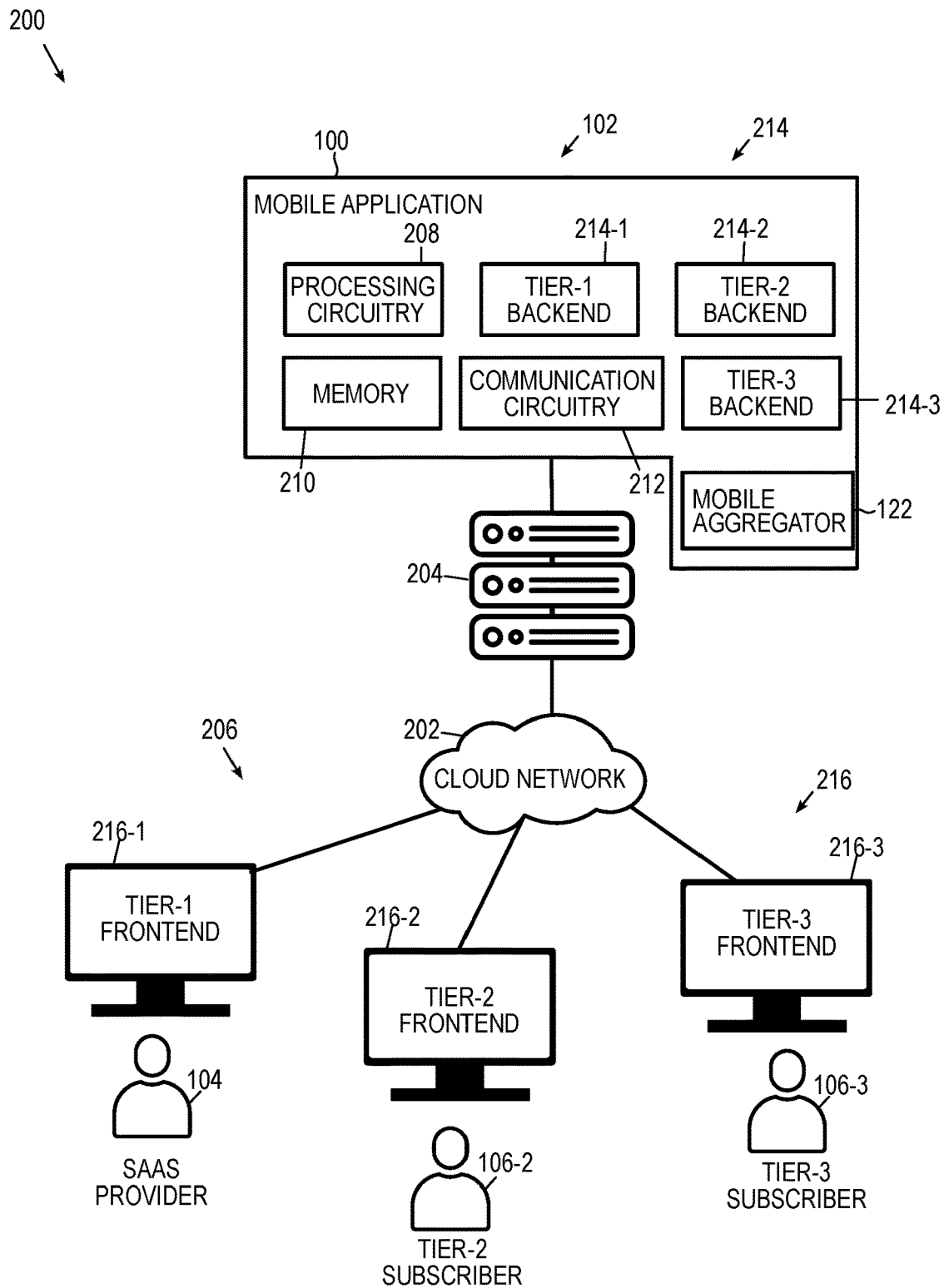
FIG. 2 is a simplified block diagram illustrating example details of the tiered software framework implementing the systems and methods for a mobile application architecture using BFF, according to some embodiments of the present disclosure.

FIG. 2 is a simplified block diagram illustrating a tiered software framework 200 according to various embodiments. In example implementations, at least some portions of the activities outlined herein may be hosted on a cloud network 202 in one or more servers 204. At least some other portions of the activities outlined herein may be implemented in one or more computing devices 206 connected over one or more communication networks with cloud network 202. In particular embodiments, cloud network 202 is a collection of hardware devices and executable software forming a shared pool of configurable computing resources (e.g., networks, servers, storage, applications, services, etc.) that may be suitably provisioned to provide on-demand self-service, network access, resource pooling, elasticity and measured service, among other features. Computing device 206 may have any desired form factor, such as a handheld or mobile computing device (e.g., a cell phone, a smart phone, a mobile Internet device, a tablet computer, a laptop computer, a netbook computer, an ultra-book computer, a Personal Digital Assistant (PDA), an ultramobile personal computer, etc.), a desktop computing device, a server or other networked computing component, a set-top box, an entertainment control unit, or a wearable computing device.

Certain portions of tiered software framework 200 (e.g., mobile application 100) may execute using a processing circuitry 208, a memory 210 and communication circuitry 212 (among other components) in one or more servers 204. Certain other portions of tiered software framework 200 may execute in one or more computing devices 206 using respective processing circuitry, memory, and communication circuitry (not shown with particularity so as not to clutter the drawing) substantially similar in functionalities to processing circuitry 208, memory 210 and communication circuitry 212. In some embodiments, one or more of these features may be implemented in hardware, provided external to these elements, or consolidated in any appropriate manner to achieve the intended functionality. The various network elements in tiered software framework 200 may include communication software that can coordinate to achieve the operations as outlined herein. In still other embodiments, these elements may include any suitable algorithms, hardware, software, components, modules, interfaces, or objects that facilitate the operations thereof.

Processing circuitry 208 may execute any type of instructions associated with data stored in memory 210 to achieve the operations detailed herein. In one example, processing circuitry 208 may transform data from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., field programmable gate array (FPGA), an erasable programmable read only memory (EPROM), an application specific integrated circuit (ASIC)) that includes digital logic, software, code, electronic instructions, flash memory, optical disks, magnetic or optical cards, other types of machine-readable mediums suitable for storing electronic instructions, or any suitable combination thereof.

In some of example embodiments, one or more memory 210 may store data used for the operations described herein. This includes memory 210 storing instructions (e.g., software, logic, code, etc.) in non-transitory media (e.g., random access memory (RAM), read only memory (ROM), FPGA, EPROM, etc.) such that the instructions are executed to carry out the activities described in this disclosure based on particular needs. In some embodiments, memory 210 may comprise non-transitory computer-readable media, including one or more memory devices such as volatile memory such as dynamic RAM (DRAM), nonvolatile memory (e.g., ROM), flash memory, solid-state memory, and/or a hard drive. In some embodiments, memory 210 may share a die with processing circuitry 208. Memory 210 may include algorithms, code, software modules, and applications, which may be executed by processing circuitry 208. The data being tracked, sent, received, or stored in tiered software framework 200 may be provided in any database, register, table, cache, queue, control list, or storage structure, based on particular needs and implementations, all of which could be referenced in any suitable timeframe.

Communication circuitry 212 may be configured for managing wired or wireless communications for the transfer of data in tiered software framework 200. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not. Communication circuitry 212 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 212 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 212 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 212 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 212 may operate in accordance with other wireless protocols in other embodiments. Communication circuitry 212 may include antennas to facilitate wireless communications and/or to receive other wireless communications.

In some embodiments, communication circuitry 212 may manage wired communications, such as electrical, optical, or any other suitable communication protocols (e.g., the Ethernet, Internet). Communication circuitry 212 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a WANs (e.g., the Internet).

Mobile application 100 may be implemented in tiered software framework 200 comprising at least three tiers 102: tier-1 (102-1), tier-2 (102-2), and tier-3 (102-3). Tiers 102 may be organized according to a hierarchy of management (i.e., to oversee, to control, to maintain), with upstream tiers managing downstream ones. Thus, tier 102-1 comprises operations that may manage tiers 102-2 and 102-3, whereas tier 102-2 comprises operations that may manage tier 102-3 but not tier 102-1. For purposes of terminology, tier 102-1 is "upstream" relative to tiers 102-2 and 102-3; tier 102-3 is "downstream" relative to tiers 102-2 and 102-1; tier 102-2 is downstream relative to tier 102-1 and upstream relative to tier 102-3. In some embodiments, each tier 102 may interact with the tier immediately adjacent thereto (e.g., downstream or upstream) but not with non-adjacent tiers. In some other embodiments, any tier 102 may interact with any other tier. In an example embodiment, tier 102-3 comprises marketing activities by business locations such as a dentist's office, a plumber's business, etc.; tier 102-2 comprises software operations by one or marketing agencies whose customers are the business locations of tier 102-3; and tier 101-1 comprises software operations by SaaS provider 104 whose customers are the marketing agencies of tier 102-2.

In various embodiments, tiers 102 may be partitioned into a backend 214 and a frontend 216. Backend 214 may comprise tier-1 backend 214-1, tier-2 backend 214-2, and tier-3 backend 214-3 provisioned in one or more servers 204. In various embodiments, mobile aggregator 122 may be coupled to (e.g., in direct communication with) tier-3 backend 214-3. In some embodiments, mobile aggregator 122 may be provisioned in the same server 204 as tier-3 backend 214-3; in other embodiments, mobile aggregator 122 may be provisioned in a different server than server 204. Likewise, frontend 216 may comprise tier-1 frontend 216-1, tier-2 frontend 216-2, and tier-3 frontend 216-3 provisioned in one or more computing devices 206. Backend 214 may comprise various modules, logic, software engines and other components that are distributed (and common) across all users of tiered software framework 200. Backend 214 may execute operations for managing and processing data, performing computations, and facilitating communication between different components, such as components of mobile application 100. In particular embodiments, backend 214 may include operations such as data management, business logic, user authentication and authorization, security and validation, application programming interfaces (APIs) with third-party components such as payment processors, etc. In various embodiments, various components of mobile application 100, may operate in backend 214 with data spread across all tiers 102-1, 102-2 and 102-3.

In a general sense, frontend 216 comprises a user interface using which users interact with tiered software framework 200. Frontend 216 may also include libraries, forms, device integrators and other components as desired and based on particular needs. Frontend 216 may be presented on a suitable display device coupled to computing device 206 and appropriate to show visual indicators, such as a heads-up display, a computer monitor, a projector, a touchscreen display, a liquid crystal display (LCD), a light-emitting diode display, and/or a flat panel display. In various embodiments, frontend 216 may be specific to the particular one of tier 102. For example, frontend 216-1 at tier-1 may comprise certain functionalities available (and visible) only to SaaS provider 104. Frontend 216-2 at tier-2 may comprise certain functionalities available (and visible) only to tier-2 subscriber 106-2. Frontend 216-3 at tier-3 may comprise certain functionalities available (and visible) only to tier-3 subscriber 106-3. In particular embodiments, frontend 216-3 provisioned in mobile devices may correspond to frontend 116 as described in reference to FIG. 1.

Tiered software framework 200 described and shown herein (and/or its associated structures) may also include suitable interfaces for receiving, transmitting, and/or otherwise communicating data or information in a network environment. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Figure 3:
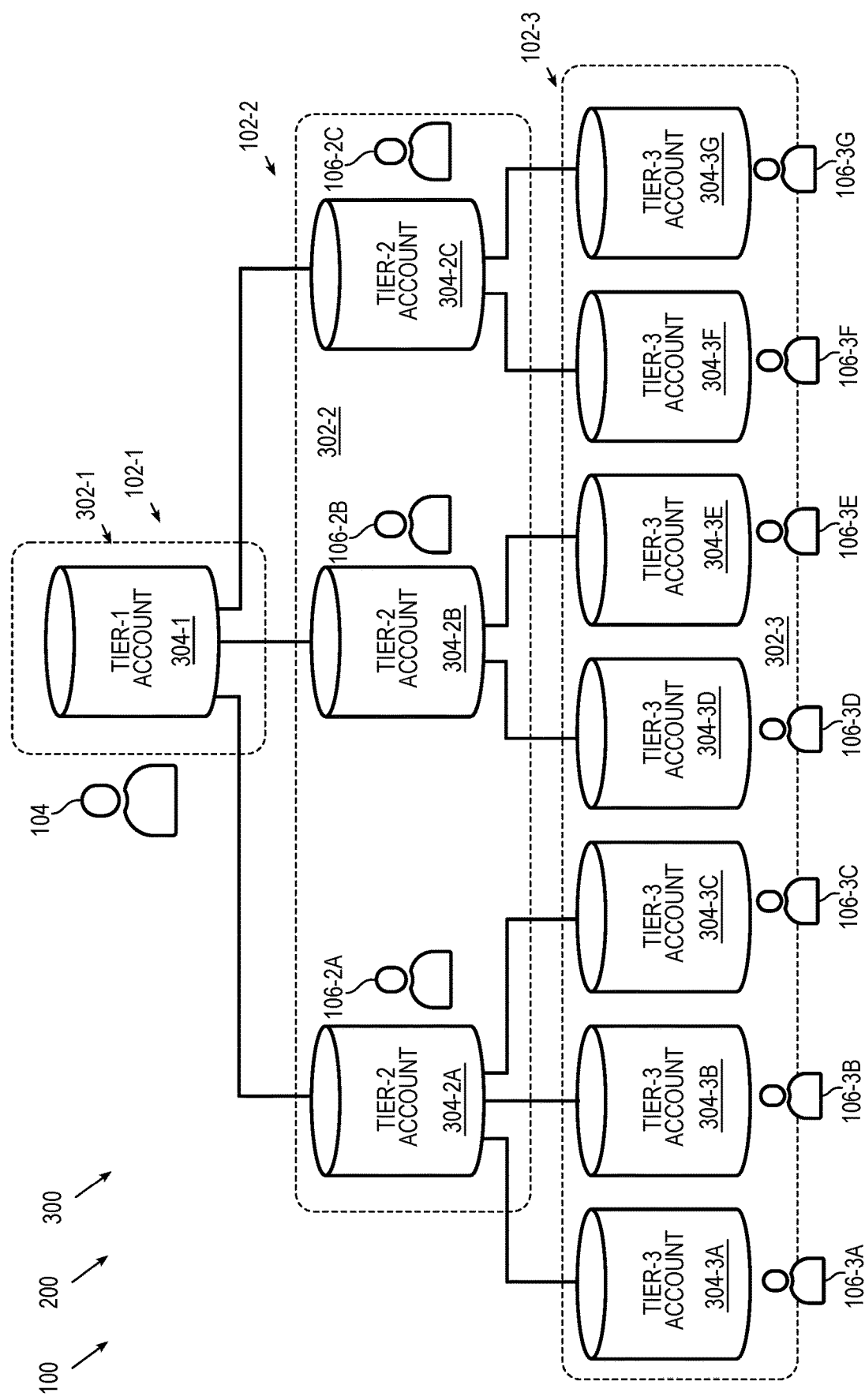
FIG. 3 is a simplified block diagram illustrating other example details of the tiered software framework implementing the systems and methods for a mobile application architecture using BFF, according to some embodiments of the present disclosure.

FIG. 3 is a simplified block diagram illustrating example details of data hierarchy 300 of tiered software framework 200 implementing mobile application 100, according to some embodiments of the present disclosure. In various embodiments, data 302 communicated in tiered software framework 200 may be exclusively received from users such as SaaS provider 104 and subscribers 106-2, and 106-3; in some other embodiments, data 302 may also be received from other sources, such as third parties and/or from the Internet. Examples of data 302 include business niche targeted by subscribers 106, marketing activities such as on social media, target audience of subscribers 106, login credentials to access various marketing platforms, frequency of marketing activities, information to be included in the content of marketing posts, customer lists, business locations, marketing platform rules, and other such data relevant to the functionalities offered by tiered software framework 200. Data 302 may be stored in data lakes, databases, data warehouses, blockchains, file systems and other types of data storage facilities within the broad scope of the embodiments with corresponding accessing and viewing capabilities as described herein.

Data 302 in each tier 102 may be contained within accounts 304 accessible and viewable with appropriate access credentials. For example, account 304-1 may be associated with SaaS provider 104. Account 304-1 may manage a plurality of accounts 304-2 at tier 102-2. Subscriber 106-2a may have a subscription to account 304-2a in plurality of accounts 304-2. Account 304-2a may manage a plurality of accounts 304-3 at tier 102-3. Subscriber 106-3a may have a subscription to account 304-3a in plurality of accounts 304-3; subscriber 106-3b may have a subscription to account 304-3b in plurality of accounts 304-3; and subscriber 106-3c may have a subscription to account 304-3c in plurality of accounts 304-3. In other words, subscriber 106-2a has three downstream subscribers at tier 102-3, namely subscribers 106-3a, 106-3b, and 106-3c with their associated respective accounts 304-3a, 304-3b, and 304-3c. Likewise for other accounts shown in the figure. Note that such a framework is merely provided for illustrative purposes and should not be construed as a limitation. Any number of subscribers may be provided at tiers 102-2 and 102-3 in tiered software framework 200 within the broad scope of the embodiments. Note also that the labeling convention followed herein uses letters to denote a separate instance of the same or similar component (e.g., "a" denotes instance A, "b" denotes instance B, and so on).

Downstream accounts may also be called "subaccounts" relative to the immediately upstream accounts in this disclosure. For example, accounts 304-3 are subaccounts relative to accounts 304-2. In the specific example shown, accounts 304-3a . . . 304-3c are subaccounts of account 304-2a; accounts 304-3d and 304-3e are subaccounts of account 304-2b; accounts 304-3f and 304-3g are subaccounts of account 304-2c. Likewise, accounts 304-2a . . . 304-2c are subaccounts of account 304-1.

In various embodiments, data 302 may be arranged in data hierarchy 300 for different accounts 304 such that certain users can view and access only a subset of data 302 according to their respective tier 102 and access credentials based on particular needs (e.g., user credentials may indicate which tier 102 and which corresponding accounts 304 are available for access and view). Such accounts 304 may be facilitated by a suitable user interface at frontend 216 for viewing the accessible data. Appropriate user authentication and authorization engines running in backend 214 may ensure that accounts 304 are maintained as desired and appropriate privacy blocks are applied at appropriate tiers 102.

In the example illustrated herein, tier-1 data 302-1 may be of account 304-1; tier-2 data 302-2 may be of accounts 304-2a, 304-2b and 304-2c corresponding to subscribers 106-2a, 106-2b and 106-2c, respectively; tier-3 data 302-3 may be of accounts 304-3a . . . 304-3g corresponding to subscribers 106-3a . . . 106-3g. Subscribers 106-3a . . . 106-3g may access and view their own respective accounts 304-3a . . . 304-3g; however, they cannot access or view other accounts 304 in the same tier 102-3 or in upstream tiers 102-2 or 102-1. Note that accessing and viewing an account refers to accessing and viewing the data of the account. Subscribers 106-2a . . . 106-2c at tier 102-3 may access and view their own respective accounts 304-2a . . . 304-2c as well as downstream accounts 304-3 of their respective subscribers 106-3; however, they cannot access or view other accounts 304-2 in the same tier 102-2, or in downstream tier 102-3 not associated with their downstream subscribers 106-3, or in upstream tier 102-1. For example, subscriber 106-2a may access and view accounts 304-2a, 304-3a, 304-3b, and 304-3c; subscriber 106-2b may access and view accounts 304-2b, 304-3d, and 304-3e; subscriber 106-2c may access and view accounts 304-2c, 304-3f, and 304-3g. SaaS provider 104 at tier 102-1 may access and view accounts 304-1 at tier 102-1, 304-2a . . . 304-2c at tier 102-2, and 304-3a . . . 304-3g at tier 102-3.

In various embodiments, each tier 102 has corresponding access credentials and data associated with accounts 304 in tiered software framework 200. Thus, access credentials associated with tier 102-1 has access to data and services in at least one account 304-1 in tier 102-1, all accounts 304-2 in the tier 102-2 and all accounts 304-3 in tier 102-3; access credentials associated with tier 102-2 has access to data and services in at least one account 304-2 in the tier 102-2 and accounts 304-3 in tier 102-3 associated with the at least one account 304-2 in the second tier; and access credentials associated with tier 102-3 has access to data and services in at least one account 304-3 in tier 102-3. Mobile application 100 may be for access credentials and data associated with tier 102-3 in various embodiments.

Figure 4:
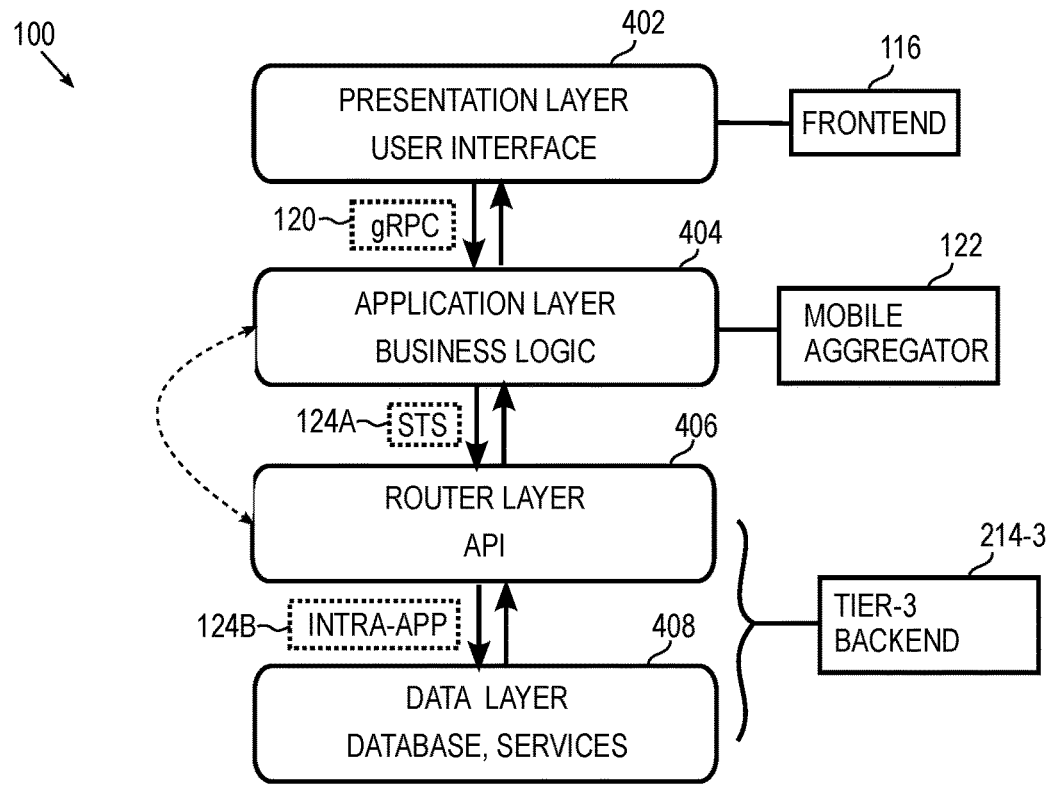
FIG. 4 is a simplified block diagram illustrating example details of the mobile application, according to some embodiments of the present disclosure.

FIG. 4 is a simplified block diagram illustrating example details of mobile application 100 according to various embodiments. Mobile application 100 may comprise various software layers, for example, a presentation layer 402, an application layer 404, a router layer 406, and a data layer 408. In various embodiments, presentation layer 402 may be provisioned in frontend 116, and may comprise a user interface having various selectable features 118. Features 118 may include elements such as buttons, menus, forms, and other interactive elements that human users see and interact with. Different features 118 may correspond to different functionalities. For example, one feature 118a may allow a user to create an event in a calendar; another feature 118b may allow the user to compose a message by writing into a text box; yet another feature 118c may allow the user to create an advertisement campaign by individually selecting various components in a form; and so on. Application layer 404 may manage various business logic of mobile application 100, processing user inputs and handling various services 128, data retrieval from database 130, and such other application specific operations.

Router layer 406 may include components such as load balancer 126 and/or services 128, for example, to manage navigation and routing of different requests within mobile application 100. In some embodiments, router layer 406 may interpret incoming messages 124 from mobile aggregator 122 and direct them to the appropriate service 128 that can process the request and generate a corresponding response according to predefined rules and configurations. In some embodiments, application layer 404 and router layer 406 may be interchanged, so that application layer 404 resides behind router layer 406. In such embodiments, load balancer 126 may first receive messages 120 in gRPC format and forward them to mobile aggregator 122 in application layer 404. Mobile aggregator 122 may respond appropriately with calls to one or more services 128 and/or databases 130. The calls may be routed to router layer 406, which may fan out the calls to applicable services 128 and/or databases 130 as appropriate. In some other embodiments, portions of router layer 406, for example, comprising load balancer 126, may be provisioned between presentation layer 402 and application layer 404, and other portions of router layer 406, for example, comprising services 128 may be provisioned between application layer 404 and data layer 408.

Data layer 408 may facilitate interactions between router layer 406 and various databases 130 to retrieve or store data, for example, managing data retrieval, updates, and storage operations. In some embodiments, load balancer 126 may be provisioned in router layer 406 whereas services 128 and databases 130 may be in data layer 408; in other embodiments, load balancer 126 and one or more services 128 may be provisioned in router layer 406 and the remaining ones of services 128 and database 130 may be provisioned in data layer 408.

In various embodiments, communication between presentation layer 402 and application layer 404 may be by way of messages 120 in gRPC format, whereas communication between application layer 404 and router layer 406 may be by way of messages 124a in STS format (e.g., REST) and messages 124b between router layer 406 and data layer 408 may be by way of messages 124b in intra-app format such as direct method function calls, shared memory, inter-process communication (IPC), and remote method invocation (RMI). In some embodiments, additional software layers may be included; in yet other embodiments, router layer 406 may be collapsed into data layer 408 or into application layer 404.

Figure 5:
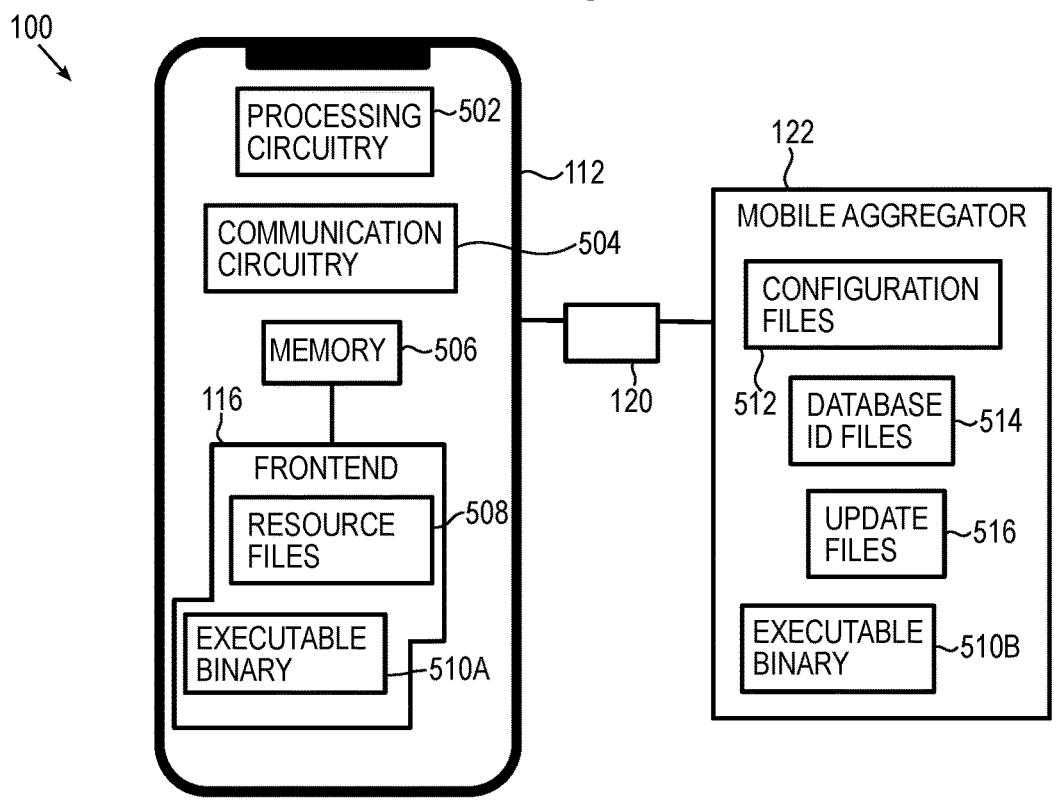
FIG. 5 is a simplified block diagram illustrating example details of the mobile application, according to some embodiments of the present disclosure.

FIG. 5 is a simplified block diagram illustrating various elements of mobile application 100 according to some embodiments of the present disclosure. Mobile device 112 comprises a processing circuitry 502, a communication circuitry 504, and a memory 506. In various embodiments, processing circuitry 502 may be substantially similar to processing circuitry 208; in other embodiments, processing circuitry 502 may be similar in some functionalities to processing circuitry 208 and different in other functionalities from processing circuitry 208. In various embodiments, communication circuitry 502 may be primarily tailored to communicate over wireless communication network 114 using wireless communication protocols, examples of which are provided in reference to FIG. 2. In various embodiments, memory 506 may be substantially similar in structure and/or type to memory 210; in other embodiments, memory 506 may be similar in some functionalities and/or structure to memory 210 and different in other functionalities and/or structure from memory 210.

In various embodiments, memory 506 may be provisioned with frontend 116, which may comprise two file packages: resource files 508 and executable binary 510a, both of which are stored in memory 506. In various embodiments, resource files 508 may comprise images, icons, text strings, audio, video, etc. for displaying the user interface of frontend 116 in mobile device 112; executable binary 510a may comprise code with instructions for mobile application 100 to execute on mobile device 112. In particular embodiments, executable binary 510a may include instructions to render a user interface in mobile device 112, send and receive messages 120, and execute instructions received in messages 120. In various embodiments, additional files such as configuration files 512, database identifier files 514, and update files 516 may be retained in mobile aggregator 122. Mobile aggregator 122 may also include executable binary 510b comprising the business logic of mobile application 100, including instructions to receive messages 120, translate messages 120 to messages 124 and vice versa, and execute instructions in messages 120 and/or 124 suitably. Offloading configuration files 512, database files 514, update files 516 and additional executable binary 510b to mobile aggregator 122 may reduce the amount of storage required on mobile device 112.

In various embodiments, executable binary 510a stored in mobile device 112 includes a stub in the compiled code that acts as a representative of the remote procedure code. When the program is run and the procedure call is issued in message 120 in gRPC, for instance, the stub receives the request and forwards it to a client runtime program in mobile device 112. The first time the stub is invoked, it contacts a name server over wireless communication network 114 to determine the transport address of mobile aggregator 122. The client runtime program in executable binary 510a has appropriate instructions to address mobile aggregator 122 and sends message 120 across wireless communication network 114 to the address returned by the name server. Similarly, mobile aggregator 122 includes a runtime program and stub in executable binary 510b that interface with the remote procedure. Response-request messages are returned according to the same protocol.

Figure 6:
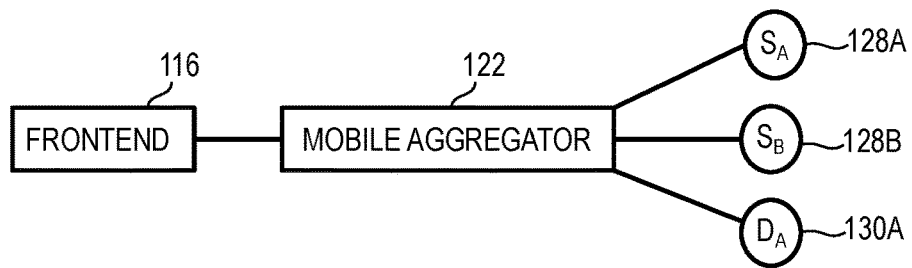
FIG. 6 is a simplified block diagram illustrating example details of the mobile application, according to some embodiments of the present disclosure.

FIG. 6 is a simplified block diagram illustrating various elements of mobile application 100 according to some embodiments of the present disclosure. Mobile application 100 may be provisioned with a common instance of mobile aggregator 122 interfacing between a single instance of frontend 116 and multiple ones of services 128 (e.g., 128a, 128b) and databases (e.g., 130a). Any updates to any of services 128 and/or databases 130 may be propagated to the common instance of mobile aggregator 122. In some embodiments, each instance of frontend 116 may communicate with a separate instance of mobile aggregator 122; in other embodiments, multiple instances of frontends 116 from separate mobile devices may interact with a common instance of mobile aggregator 122. Various such configurations may be provisioned in mobile application 100 within the broad scope of the embodiments herein.

Figure 7:
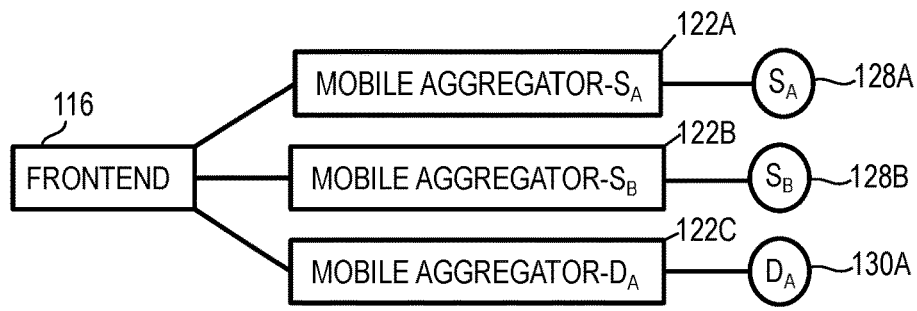
FIG. 7 is a simplified block diagram illustrating example details of the mobile application, according to some embodiments of the present disclosure.

FIG. 7 is a simplified block diagram illustrating various elements of mobile application 100 according to some embodiments of the present disclosure. Mobile application 100 may be provisioned with separate instances of mobile aggregator 122 (e.g., 122a, 122b, 122c) interfacing between frontend 116 and multiple ones of services 128 (e.g., 128a, 128b) and databases (e.g., 130a). Each separate instance of mobile aggregator 122 may correspond to a particular one of services 128 and/or databases 130. In the example shown, mobile aggregator 122a may interface between frontend 116 and service 128a; mobile aggregator 122b may interface between frontend 116 and service 128b; mobile aggregator 122c may interface between frontend 116 and database 130a; and so on. Any updates to any of services 128 and/or databases 130 may be propagated to the corresponding instance of mobile aggregator 122.

Figure 8:
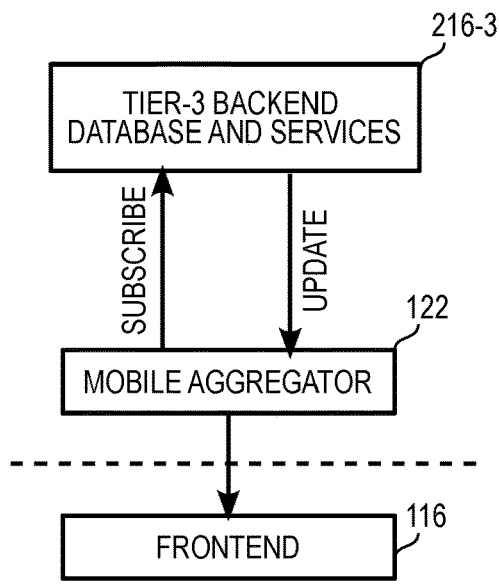
FIG. 8 is a simplified block diagram illustrating example details of the mobile application, according to some embodiments of the present disclosure.

FIG. 8 is a simplified block diagram illustrating various elements of mobile application 100 according to some embodiments of the present disclosure. Mobile aggregator 122 may subscribe to tier-3 backend 216-3 comprising services 128 and databases 130. Any updates to services 128 and databases 130 may be automatically propagated to mobile aggregator 122 thereafter. The updates may be stored in mobile aggregator 122 as update files 516 in some embodiments. Any updates to resource files 508 or executable binary 510*a* may be propagated to frontend 116 by messages 120 suitably.

Although the present disclosure has been described in detail with reference to particular arrangements and configurations, these example configurations and arrangements may be changed significantly without departing from the scope of the present disclosure. For example, although the present disclosure has been described with reference to particular network systems such as cloud networks, mobile application 100 may be implemented in other networks such as LANs. Moreover, although tiered software framework 200 has been illustrated with reference to particular elements and operations that facilitate the software process, these elements, and operations may be replaced by any suitable architecture or process that achieves the intended functionality of mobile application 100.

EXAMPLE METHODS

Figure 9:
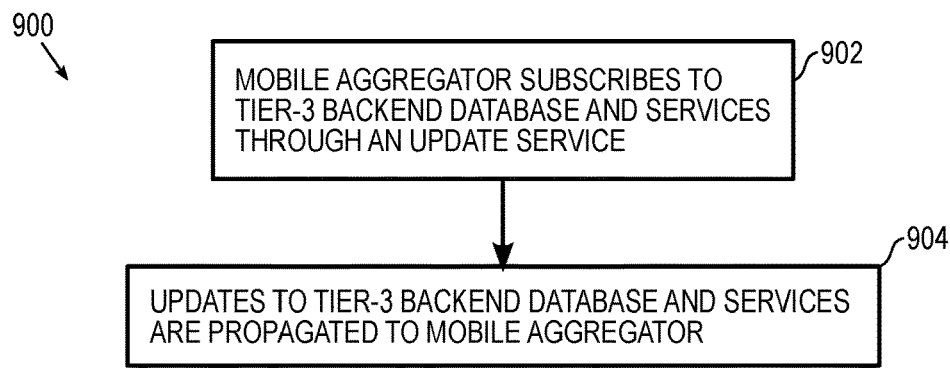
FIG. 9 is a simplified flow diagram illustrating example operations associated with the mobile application, according to some embodiments of the present disclosure.

FIG. 9 is a simplified flow diagram illustrating example operations 900 that may be associated with mobile application 100 according to various embodiments. At 902, mobile aggregator 122 may subscribe to tier-3 backend 216-3 comprising services 128 and databases 130. In various embodiments, mobile aggregator 122 may subscribe to tier-3 backend 216-3 through an intermediate service using one or more of available techniques, including webhooks, data synchronization protocols, event-based messaging systems, and/or push notifications. Mobile aggregator 122 may not access or change the state of any one or more services 128 and/or databases 130 or mobile application 100 as a whole on its own, for example, to ensure that data integrity on the backend is not compromised by changes to mobile aggregator 122 and/or frontend 116. At 904, any updates to services 128 and databases 130 may be automatically propagated to mobile aggregator 122 thereafter. The updates may be stored in mobile aggregator 122 as update files 516 in some embodiments.

Figure 10:
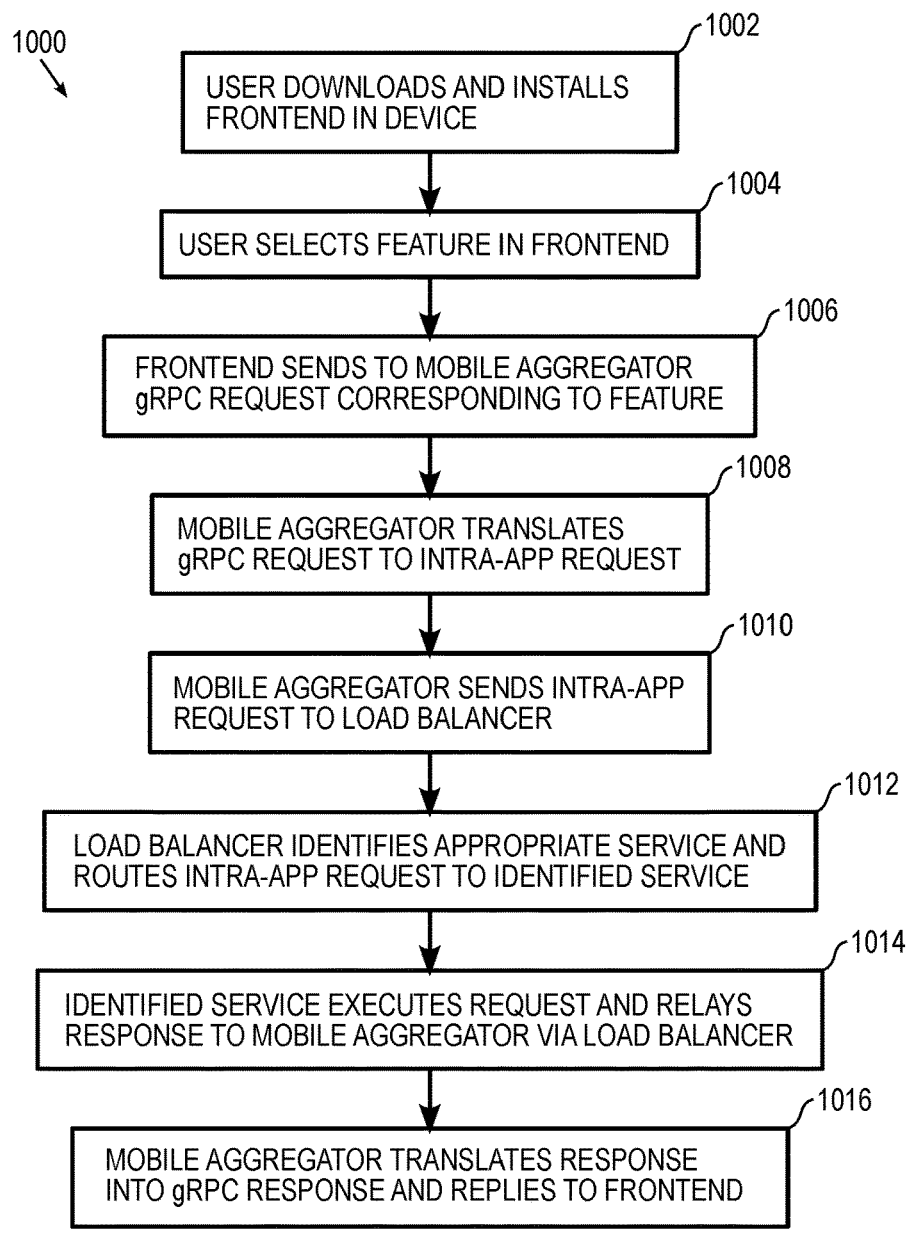
FIG. 10 is a simplified flow diagram illustrating other example operations associated with the mobile application, according to some embodiments of the present disclosure.

FIG. 10 is a simplified flow diagram illustrating example operations 1000 that may be associated with mobile application 100 according to various embodiments. At 1002, a user may download and install frontend 116 in mobile device 112. At 1004, the user may select feature 118 in frontend 116. At 1006, frontend 116 may send a gRPC request in message 120 to mobile aggregator 122, the request corresponding to selected feature 118. At 1008, mobile aggregator 122 may translate the gRPC request to an intra-app (or STS) request in message 124. At 1010, mobile aggregator 122 may send the intra-app (or STS) request in message 124 to load balancer 126. At 1012, load balancer 126 may identify the appropriate service 128 (e.g., 128*a*) and route the intra-app request appropriately to identified service 128*a*. At 1014, identified service 128*a* may execute the request and replay the response to mobile aggregator 122 via load balancer 126. At 1016, mobile aggregator 122 may translate message 124 to gRPC response in message 120 and reply to frontend 116 suitably.

FIG. 11 is a simplified flow diagram illustrating example operations 1100 that may be executed by mobile aggregator 122 according to various embodiments. At 1110, mobile aggregator 122 may communicate first messages 120 over wireless communication network 114 with frontend 116 of mobile application 100 executing in mobile device 112. In an example embodiment, first messages 120 may comprise instructions in a suitable RPC protocol, for example, gRPC. At 1112, mobile aggregator 122 may execute the instructions in first messages 120. At 1114, mobile aggregator 122 may identify one or more services 128 of mobile application 100 called by the instructions in first messages 120. At 1116, mobile aggregator 122 may generate second messages 124 in another protocol (e.g., STS or intra-app protocols) compatible with communication in cloud network 110. At 1117, mobile aggregator 122 may communicate second messages 124 to one or more services 128 via load balancer 126. In some such embodiments, load balancer 126 may identify one or more services 128 relevant to second messages 124, and forward second messages 124 appropriately to the relevant one of one or more services 128.

Note that in various embodiments, mobile aggregator 122 may not directly access one or more databases 130. In some embodiments, mobile aggregator 122 may access one or more services 128 but not one or more databases 130, for example, to ensure that data in databases 130 is not corrupted. In some embodiments, mobile aggregator 122 and one or more services 128 may be provisioned on the same server in cloud network 110; in other embodiments, mobile aggregator 122 and one or more services 128 may be provisioned in different servers in cloud network 110. In various embodiments, frontend 116 may not directly access any component in mobile application 100 other than mobile aggregator 122.

Figure 12:
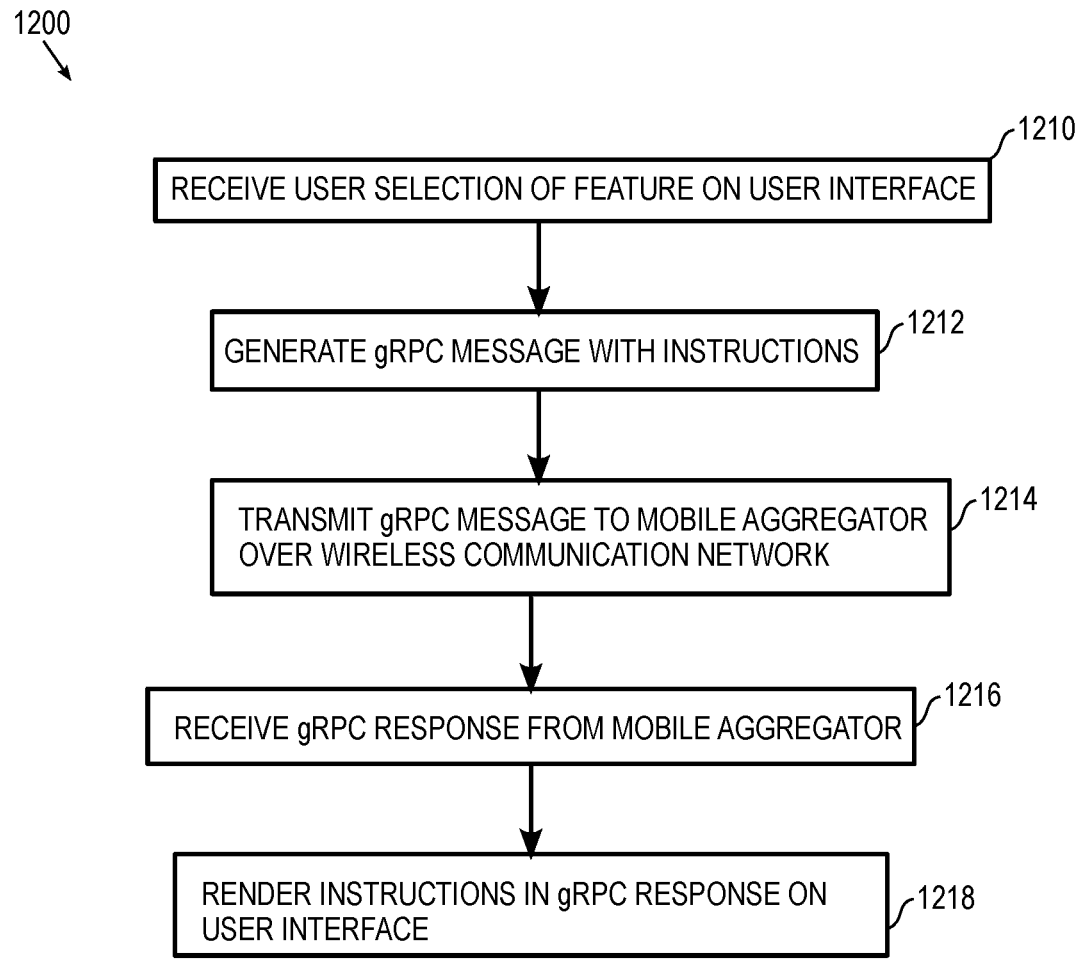
FIG. 12 is a simplified flow diagram illustrating yet other example operations associated with the mobile application, according to some embodiments of the present disclosure.

FIG. 12 is a simplified flow diagram illustrating example operations 1200 that may be executed by frontend 116 according to various embodiments. At 1210, frontend 116 may receive user selection of feature 118 on the user interface in mobile device 112. At 1212, frontend 116 may generate message 120 in gRPC protocol with instructions according to the user selection. For example, selecting the login feature may generate one set of instructions; selecting an appointment scheduling may generate another set of instructions; and so on. At 1214, frontend 116 may transmit message 120 to mobile aggregator 122 over wireless communication network 114. In an example embodiment, frontend 116 may generate a system call to the operating system of mobile device 112, which may then package message 120 appropriately for transmission over wireless communication network 114. At 1216, frontend 116 may receive another message 120 in gRPC protocol from mobile aggregator 122. At 1218, frontend 116 may render instructions in the received message 120 on the user interface of mobile device 112. For example, the instructions may ask to generate a calendar screen; or a map; etc. depending on the user selection at 1210. In some embodiments, render Instructions in gRPC response may be cached in memory 506 of mobile device 112 (e.g., going through a secondary layer of on-device caching) for even faster subsequent access, and/or application startup times.

In various embodiments, the operations described in FIGS. 9-12 are performed automatically without human intervention. Although FIGS. 9-12 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 9-12 may be modified in accordance with the present disclosure to facilitate a mobile application architecture using BFF in tiered software framework 200 as disclosed herein. Although various operations are illustrated in FIGS. 9-12 once each, the operations may be repeated as often as desired.

It is important to note that the operations described with reference to the preceding figures illustrate only some of the possible scenarios that may be executed by, or within, mobile application 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

SELECT EXAMPLES

Example 1 provides a method for operating a mobile application using backend-for-frontend in a tiered software framework, the method including communicating, by a mobile aggregator, first messages over a wireless communication network with a frontend of the mobile application executing in a mobile device, the first messages including instructions in Remote Procedure Call (RPC) protocol; executing, by the mobile aggregator, the instructions in first messages; identifying, by the mobile aggregator, one or more services of the mobile application called by the instructions in the first messages, the one or more services executing in a cloud network; generating second messages in another protocol compatible with communication in the cloud network; and communicating, by the mobile aggregator, the second messages in the another protocol to the one or more services in the cloud network, in which: the mobile application includes a presentation layer, an application layer, and a data layer, the presentation layer including a user interface of the frontend executes in the mobile device, the application layer including the mobile aggregator executes in a first server in the cloud network, the data layer including the one or more services executes in a second server in the cloud network, and the mobile aggregator does not store any transaction history between any two of the first messages.

Example 2 provides the method of example 1, in which: the mobile aggregator communicates the second messages to a load balancer in the cloud network, the load balancer identifies the one or more services, and the load balancer forwards the second messages to one or more services.

Example 3 provides the method of example 1 or 2, further including identifying one or more databases called by the instructions in the first messages, the one or more databases stored in the cloud network; and communicating, by the mobile aggregator, the second messages in the another protocol to a load balancer in the cloud network, in which the load balancer forwards the second messages to the one or more databases.

Example 4 provides the method of example 3, in which the mobile aggregator does not directly access the one or more databases.

Example 5 provides the method of any one of examples 1-4, in which the first server is same as the second server.

Example 6 provides the method of any one of examples 1-4, in which the first server is different from the second server.

Example 7 provides the method of any one of examples 1-6, in which the frontend of the mobile application does not directly access the one or more services in the cloud network.

Example 8 provides the method of any one of examples 1-7, in which the presentation layer includes a plurality of the mobile aggregators, each one of the mobile aggregators corresponding to a separate service or a separate database in the cloud network.

Example 9 provides the method of any one of examples 1-8, further including subscribing, by the mobile aggregator, to one or more databases and one or more services in the cloud network, in which any update to the one or more databases or the one or more services is routed to the mobile aggregator automatically.

Example 10 provides the method of any one of examples 1-9, in which: the first messages include a first set, the first set is associated with a first feature of the mobile application, a second feature of the mobile application is associated with a second set different from the first set.

Example 11 provides the method of any one of examples 1-10, in which: the mobile application includes a first portion stored in the mobile device, and a second portion and a third portion stored in the cloud network, the first portion includes a first executable binary and resource files, the second portion including configuration files, database identification files, update files and a second executable binary, is stored in the mobile aggregator in the first server, and the third portion including files associated with the one or more services and one or more databases is stored in the second server.

Example 12 provides the method of example 11, in which: the resource files are to display the user interface in the mobile device, and the first executable binary is to generate and unpack first messages in the RPC protocol to and from the mobile aggregator.

Example 13 provides the method of example 12, in which selection of a feature on the user interface triggers generation of first messages in the RPC protocol.

Example 14 provides the method of any one of examples 1-13, in which: the tiered software framework includes a first tier, a second tier, and a third tier, each tier has corresponding access credentials and data associated with accounts therewith, access credentials associated with the first tier has access to data and services in at least one account in the first tier, all accounts in the second tier and all accounts in the third tier, access credentials associated with the second tier has access to data and services in at least one account in the second tier and accounts in the third tier associated with the at least one account in the second tier, and access credentials associated with the third tier has access to data and services in at least one account in the third tier.

Example 15 provides the method of example 14, in which the mobile application is for access credentials and data associated with the third tier.

Example 16 provides non-transitory computer-readable tangible media that includes instructions for execution, which when executed by a processor of a computing device, is operable to perform operations including communicating, by a mobile aggregator, first messages over a wireless communication network with a frontend of a mobile application executing in a mobile device, the first messages including instructions in Remote Procedure Call (RPC) protocol; executing, by the mobile aggregator, the instructions in the first messages; identifying, by the mobile aggregator, one or more services of the mobile application called by the instructions in the first messages, the one or more services executing in a cloud network; generating second messages in another protocol compatible with communication in the cloud network; and communicating, by the mobile aggregator, the second messages in the another protocol to the one or more services in the cloud network, in which: the mobile application includes a presentation layer, an application layer, and a data layer, the presentation layer including a user interface of the frontend executes in the mobile device, the application layer including the mobile aggregator executes in a first server in the cloud network, the data layer including the one or more services executes in a second server in the cloud network, and the mobile aggregator does not store any transaction history between any two of the first messages.

Example 17 provides the non-transitory computer-readable tangible media of example 16, in which: the mobile aggregator communicates the second messages to a load balancer in the cloud network, the load balancer identifies the one or more services, and the load balancer forwards the second messages to one or more services.

Example 18 provides the non-transitory computer-readable tangible media of example 16 or 17, in which the operations further include identifying one or more databases called by the instructions in the first messages, the one or more databases stored in the cloud network; and communicating, by the mobile aggregator, the second messages in the another protocol to a load balancer in the cloud network, in which the load balancer forwards the second messages to the one or more databases.

Example 19 provides the non-transitory computer-readable tangible media of example 18, in which the mobile aggregator does not directly access the one or more databases.

Example 20 provides the non-transitory computer-readable tangible media of any one of examples 16-19, in which the first server is same as the second server.

Example 21 provides the non-transitory computer-readable tangible media of any one of examples 16-19, in which the first server is different from the second server.

Example 22 provides the non-transitory computer-readable tangible media of any one of examples 16-19, in which the frontend of the mobile application does not directly access the one or more services in the cloud network.

Example 23 provides the non-transitory computer-readable tangible media of any one of examples 16-22, in which the presentation layer includes a plurality of the mobile aggregators, each one of the mobile aggregators corresponding to a separate service or a separate database in the cloud network.

Example 24 provides the non-transitory computer-readable tangible media of any one of examples 16-23, in which the operations further include subscribing, by the mobile aggregator, to one or more databases and one or more services in the cloud network, in which any update to the one or more databases or the one or more services is routed to the mobile aggregator automatically.

Example 25 provides the non-transitory computer-readable tangible media of any one of examples 16-24, in which: the first messages include a first set, the first set is associated with a first feature of the mobile application, a second feature of the mobile application is associated with a second set different from the first set.

Example 26 provides the non-transitory computer-readable tangible media of any one of examples 16-25, in which: the mobile application includes a first portion stored in the mobile device, and a second portion and a third portion stored in the cloud network, the first portion includes a first executable binary and resource files, the second portion including configuration files, database identification files, update files and a second executable binary, is stored in the mobile aggregator in the first server, and the third portion including files associated with the one or more services and one or more databases is stored in the second server.

Example 27 provides the non-transitory computer-readable tangible media of example 26, in which: the resource files are to display the user interface in the mobile device, and the first executable binary is to generate and unpack first messages in the RPC protocol to and from the mobile aggregator.

Example 28 provides the non-transitory computer-readable tangible media of example 27, in which selection of a feature on the user interface triggers generation of first messages in the RPC protocol.

Example 29 provides the non-transitory computer-readable tangible media of any one of examples 16-28, in which: the mobile application executes in a tiered software framework, the tiered software framework includes a first tier, a second tier, and a third tier, each tier has corresponding access credentials and data associated with accounts therewith, access credentials associated with the first tier has access to data and services in at least one account in the first tier, all accounts in the second tier and all accounts in the third tier, access credentials associated with the second tier has access to data and services in at least one account in the second tier and accounts in the third tier associated with the at least one account in the second tier, and access credentials associated with the third tier has access to data and services in at least one account in the third tier.

Example 30 provides the non-transitory computer-readable tangible media of example 29, in which the mobile application is for access credentials and data associated with the third tier.

Example 31 provides an apparatus including a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: communicating, by a mobile aggregator, first messages over a wireless communication network with a frontend of a mobile application executing in a mobile device, the first messages including instructions in Remote Procedure Call (RPC) protocol; executing, by the mobile aggregator, the instructions in the first messages; identifying, by the mobile aggregator, one or more services of the mobile application called by the instructions in the first messages, the one or more services executing in a cloud network; generating second messages in another protocol compatible with communication in the cloud network; and communicating, by the mobile aggregator, the second messages in the another protocol to the one or more services in the cloud network, in which: the mobile application includes a presentation layer, an application layer, and a data layer, the presentation layer including a user interface of the frontend executes in the mobile device, the application layer including the mobile aggregator executes in a first server in the cloud network, the data layer including the one or more services executes in a second server in the cloud network, and the mobile aggregator does not store any transaction history between any two of the first messages.

Example 32 provides the apparatus of example 31, in which: the mobile aggregator communicates the second messages to a load balancer in the cloud network, the load balancer identifies the one or more services, and the load balancer forwards the second messages to one or more services.

Example 33 provides the apparatus of example 31 or 32, further configured for: identifying one or more databases called by the instructions in the first messages, the one or more databases stored in the cloud network; and communicating, by the mobile aggregator, the second messages in the another protocol to a load balancer in the cloud network, in which the load balancer forwards the second messages to the one or more databases.

Example 34 provides the apparatus of example 33, in which the mobile aggregator does not directly access the one or more databases.

Example 35 provides the apparatus of any one of examples 31-34, in which the first server is same as the second server.

Example 36 provides the apparatus of any one of examples 31-34, in which the first server is different from the second server.

Example 37 provides the apparatus of any one of examples 31-36, in which the frontend of the mobile application does not directly access the one or more services in the cloud network.

Example 38 provides the apparatus of any one of examples 31-37, in which the presentation layer includes a plurality of the mobile aggregators, each one of the mobile aggregators corresponding to a separate service or a separate database in the cloud network.

Example 39 provides the apparatus of any one of examples 31-38, further configured for subscribing, by the mobile aggregator, to one or more databases and one or more services in the cloud network, in which any update to the one or more databases or the one or more services is routed to the mobile aggregator automatically.

Example 40 provides the apparatus of any one of examples 31-39, in which: the first messages include a first set, the first set is associated with a first feature of the mobile application, a second feature of the mobile application is associated with a second set different from the first set.

Example 41 provides the apparatus of any one of examples 31-40, in which: the mobile application includes a first portion stored in the mobile device, and a second portion and a third portion stored in the cloud network, the first portion includes a first executable binary and resource files, the second portion including configuration files, database identification files, update files and a second executable binary, is stored in the mobile aggregator in the first server, and the third portion including files associated with the one or more services and one or more databases is stored in the second server.

Example 42 provides the apparatus of example 41, in which: the resource files are to display the user interface in the mobile device, and the first executable binary is to generate and unpack first messages in the RPC protocol to and from the mobile aggregator.

Example 43 provides the apparatus of example 42, in which selection of a feature on the user interface triggers generation of first messages in the RPC protocol.

Example 44 provides the apparatus of any one of examples 31-43, in which: the mobile application executes in a tiered software framework, the tiered software framework includes a first tier, a second tier, and a third tier, each tier has corresponding access credentials and data associated with accounts therewith, access credentials associated with the first tier has access to data and services in at least one account in the first tier, all accounts in the second tier and all accounts in the third tier, access credentials associated with the second tier has access to data and services in at least one account in the second tier and accounts in the third tier associated with the at least one account in the second tier, and access credentials associated with the third tier has access to data and services in at least one account in the third tier.

Example 45 provides the apparatus of example 44, in which the mobile application is for access credentials and data associated with the third tier.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for operating a mobile application using backend-for-frontend in a tiered software framework, the method comprising:
   receiving, by a mobile aggregator, a set of first messages over a wireless communication network from a frontend of the mobile application executing in a mobile device, the set of first messages comprising instructions in Remote Procedure Call (RPC) protocol to execute a feature of the mobile application, wherein:
      invoking the RPC protocol triggers suspending a calling environment in the mobile device and transferring procedure parameters across the wireless communication network from the mobile device to the mobile aggregator,
      the feature comprises one or more services of the mobile application executing in a cloud network,
      the set of first messages identifies the mobile aggregator as recipient, and
      different features of the mobile application are associated with respectively different sets of first messages;
   executing, by the mobile aggregator, the instructions in the first messages, wherein executing the instructions comprises:
      identifying, by the mobile aggregator, the one or more services of the mobile application called by the instructions in the first messages;
      generating second messages comprising other instructions in another protocol compatible with communication in the cloud network to execute the feature of the mobile application;
      communicating, by the mobile aggregator, the second messages in the another protocol to the one or more services in the cloud network;
      receiving results from the one or more services; and
      generating a set of response messages with the results in the RPC protocol; and
   sending the set of response messages to the frontend, wherein:
      sending the response messages triggers unsuspending the calling environment and resuming execution at the frontend,
      and
      transaction history between any two of the first messages is stored in the frontend or in the one or more services.

2. The method of claim 1, wherein:
   the mobile aggregator communicates the second messages to a load balancer in the cloud network,
   the load balancer identifies the one or more services, and
   the load balancer forwards the second messages to one or more services.

3. The method of claim 1, wherein a presentation layer includes a plurality of the mobile aggregators, each one of the mobile aggregators corresponding to a separate service or a separate database in the cloud network.

4. The method of claim 1, further comprising subscribing, by the mobile aggregator, to one or more databases and one or more services in the cloud network, wherein any update to the one or more databases or the one or more services is routed to the mobile aggregator automatically.

5. The method of claim 1, wherein:
the first messages comprise a first set,
the first set is associated with a first feature of the mobile application,
a second feature of the mobile application is associated with a second set different from the first set.

6. The method of claim 1, wherein:
the mobile application comprises a first portion stored in the mobile device, and a second portion and a third portion stored in the cloud network,
the first portion includes a first executable binary and resource files,
the second portion including configuration files, database identification files, update files and a second executable binary, is stored in the mobile aggregator in a first server, and
the third portion including files associated with the one or more services and one or more databases is stored in a second server.

7. The method of claim 6, wherein:
the resource files are to display a user interface in the mobile device, and
the first executable binary is to generate and unpack first messages in the RPC protocol to and from the mobile aggregator.

8. The method of claim 7, wherein selection of a feature on the user interface triggers generation of first messages in the RPC protocol.

9. Non-transitory computer-readable tangible media that includes instructions for execution, which when executed by a processor of a computing device, is operable to perform operations comprising:
receiving, by a mobile aggregator, a set of first messages over a wireless communication network from a frontend of a mobile application executing in a mobile device, the set of first messages comprising instructions in Remote Procedure Call (RPC) protocol execute a feature of the mobile application, wherein:
invoking the RPC protocol triggers suspending a calling environment in the mobile device and transferring procedure parameters across the wireless communication network from the mobile device to the mobile aggregator,
the feature comprises one or more services of the mobile application executing in a cloud network,
the set of first messages identifies the mobile aggregator as recipient, and
different features of the mobile application are associated with respectively different sets of first messages;
executing, by the mobile aggregator, the instructions in the first messages, wherein executing the instructions comprises:
identifying, by the mobile aggregator, the one or more services of the mobile application called by the instructions in the first messages;
generating second messages comprising other instructions in another protocol compatible with communication in the cloud network to execute the feature of the mobile application;
communicating, by the mobile aggregator, the second messages in the another protocol to the one or more services in the cloud network;
receiving results from the one or more services; and
generating a set of response messages with the results in the RPC protocol; and
sending the set of response messages to the frontend, wherein:
sending the response messages triggers unsuspending the calling environment and resuming execution at the frontend,
and
transaction history between any two of the first messages is stored in the frontend or in the one or more services.

10. The non-transitory computer-readable tangible media of claim 9, wherein:
the mobile aggregator communicates the second messages to a load balancer in the cloud network,
the load balancer identifies the one or more services, and
the load balancer forwards the second messages to one or more services.

11. The non-transitory computer-readable tangible media of claim 9, wherein the operations further comprise:
identifying one or more databases called by the instructions in the first messages, the one or more databases stored in the cloud network; and
communicating, by the mobile aggregator, the second messages in the another protocol to a load balancer in the cloud network, wherein the load balancer forwards the second messages to the one or more databases.

12. The non-transitory computer-readable tangible media of claim 9, wherein a presentation layer includes a plurality of the mobile aggregators, each one of the mobile aggregators corresponding to a separate service or a separate database in the cloud network.

13. The non-transitory computer-readable tangible media of claim 9, wherein the operations further comprise subscribing, by the mobile aggregator, to one or more databases and one or more services in the cloud network, wherein any update to the one or more databases or the one or more services is routed to the mobile aggregator automatically.

14. The non-transitory computer-readable tangible media of claim 9, wherein:
the mobile application comprises a first portion stored in the mobile device, and a second portion and a third portion stored in the cloud network,
the first portion includes a first executable binary and resource files,
the second portion including configuration files, database identification files, update files and a second executable binary, is stored in the mobile aggregator in a first server, and
the third portion including files associated with the one or more services and one or more databases is stored in a second server.

15. The non-transitory computer-readable tangible media of claim 14, wherein:
the resource files are to display a user interface in the mobile device, and
the first executable binary is to generate and unpack first messages in the RPC protocol to and from the mobile aggregator.

16. An apparatus comprising:
a processing circuitry;
a memory storing data; and
a communication circuitry, wherein the processing circuitry executes instructions associated with the data, the processing circuitry is coupled to the communication circuitry and the memory, and the processing circuitry and the memory cooperate, such that the apparatus is configured for:
receiving, by a mobile aggregator, a set of first messages over a wireless communication network from a frontend of a mobile application executing in a mobile device, the set of first messages comprising instructions in Remote Procedure Call (RPC) protocol to execute a feature of the mobile application, wherein:
invoking the RPC protocol triggers suspending a calling environment in the mobile device and transferring procedure parameters across the wireless communication network from the mobile device to the mobile aggregator,
the feature comprises one or more services of the mobile application executing in a cloud network,
the set of first messages identifies the mobile aggregator as recipient, and
different features of the mobile application are associated with respectively different sets of first messages;
executing, by the mobile aggregator, the instructions in the first messages, wherein executing the instructions comprises:
identifying, by the mobile aggregator, the one or more services of the mobile application called by the instructions in the first messages;
generating second messages comprising other instructions in another protocol compatible with communication in the cloud network to execute the feature of the mobile application;
communicating, by the mobile aggregator, the second messages in the another protocol to the one or more services in the cloud network;
receiving results from the one or more services; and
generating a set of response messages with the results in the RPC protocol; and
sending the set of response messages to the frontend, wherein:
sending the response messages triggers unsuspending the calling environment and resuming execution at the frontend,
and
transaction history between any two of the first messages is stored in the frontend or in the one or more services.

17. The apparatus of claim 16, wherein:
the mobile aggregator communicates the second messages to a load balancer in the cloud network,
the load balancer identifies the one or more services, and
the load balancer forwards the second messages to one or more services.

18. The apparatus of claim 16, wherein the mobile aggregator executes in a first server, and the one or more services executes in a second server.

19. The apparatus of claim 16, wherein:
the mobile application executes in a tiered software framework,
the tiered software framework comprises a first tier, a second tier, and a third tier,
each tier has corresponding access credentials and data associated with accounts therewith,
access credentials associated with the first tier has access to data and services in at least one account in the first tier, all accounts in the second tier and all accounts in the third tier,
access credentials associated with the second tier has access to data and services in at least one account in the second tier and accounts in the third tier associated with the at least one account in the second tier, and
access credentials associated with the third tier has access to data and services in at least one account in the third tier.

20. The apparatus of claim 19, wherein the mobile application is for access credentials and data associated with the third tier.

* * * * *